United States Patent
Kubota

(10) Patent No.: US 11,309,755 B2
(45) Date of Patent: Apr. 19, 2022

(54) ROTARY ELECTRIC MACHINE AND VEHICLE EQUIPPED WITH ROTARY ELECTRIC MACHINE

(71) Applicant: HONDA MOTOR CO., LTD., Tokyo (JP)

(72) Inventor: Yoshihisa Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 16/597,030

(22) Filed: Oct. 9, 2019

(65) Prior Publication Data
US 2020/0127512 A1    Apr. 23, 2020

(30) Foreign Application Priority Data

Oct. 23, 2018   (JP) .............................. JP2018-198871

(51) Int. Cl.
*H02K 1/28*   (2006.01)
*H02K 1/27*   (2006.01)
(Continued)

(52) U.S. Cl.
CPC ................. *H02K 1/28* (2013.01); *H02K 1/02* (2013.01); *H02K 1/276* (2013.01); *H02K 7/006* (2013.01)

(58) Field of Classification Search
CPC .......... H02K 1/02; H02K 1/276; H02K 1/28; H02K 7/006; H02K 1/2766
(Continued)

(56) References Cited

U.S. PATENT DOCUMENTS

2010/0148612 A1    6/2010   Takemoto et al.
2011/0260466 A1*   10/2011  Hori ..................... H02K 1/2766
                                                                290/1 B
(Continued)

FOREIGN PATENT DOCUMENTS

JP    2002-034185 A    1/2002
JP    2008-072790 A    3/2008
(Continued)

OTHER PUBLICATIONS

Japanese Office Action received in corresponding JP Application No. 2018-198871 dated Mar. 10, 2020 with English translation (11 pages).
(Continued)

*Primary Examiner* — Alex W Mok
(74) *Attorney, Agent, or Firm* — Rankin, Hill & Clark LLP

(57) ABSTRACT

A rotary electric machine includes: an annular stator including coils disposed in a stator core; and an annular rotor disposed inside the stator and opposite to an inner circumferential wall of the stator. The rotor includes a rotor core having receiving holes for magnetic material members. The receiving holes extend in an axial direction of a drive shaft and are arranged in a circumferential direction of the rotor core. The rotor includes a pair of protrusions provided in each receiving hole. The protrusions jut out from an inner wall of the receiving hole to hold a magnetic material member. Each magnetic material member includes a hard magnetic material member and a soft magnetic material member stacked one on another in a direction of magnetization. The soft magnetic material member is disposed to border the inner wall of the receiving hole at positions where the protrusions are provided.

14 Claims, 13 Drawing Sheets

(51) Int. Cl.
*H02K 1/02* (2006.01)
*H02K 7/00* (2006.01)
*H02K 1/276* (2022.01)

(58) Field of Classification Search
USPC .................................................. 310/156.08
See application file for complete search history.

(56) References Cited

U.S. PATENT DOCUMENTS

| | | | | |
|---|---|---|---|---|
| 2011/0278978 A1* | 11/2011 | Taniguchi | ............ | H02K 1/2746 |
| | | | | 310/156.54 |
| 2012/0139380 A1* | 6/2012 | Taniguchi | ............ | H02K 1/2746 |
| | | | | 310/156.48 |
| 2012/0175987 A1 | 7/2012 | Takemoto et al. | | |
| 2012/0187696 A1* | 7/2012 | Miyamoto | ............. | H02K 1/276 |
| | | | | 290/55 |
| 2013/0334910 A1* | 12/2013 | Takahashi | .............. | H02K 15/03 |
| | | | | 310/52 |
| 2015/0137650 A1* | 5/2015 | Takahashi | ............ | H02K 1/2766 |
| | | | | 310/156.56 |
| 2018/0145552 A1* | 5/2018 | Hattori | ................. | H02K 1/2766 |
| 2018/0248428 A1* | 8/2018 | Nigo | ..................... | F25B 31/026 |

FOREIGN PATENT DOCUMENTS

| | | |
|---|---|---|
| JP | 2010-252530 A | 11/2010 |
| JP | 2016-005356 A | 1/2016 |
| JP | 2017-158282 A | 9/2017 |
| KR | 100812784 B1 | 3/2008 |
| WO | WO-2014188910 A1 * 11/2014 | ........... H02K 1/2786 |

OTHER PUBLICATIONS

Office Action received in corresponding CN application No. 201910990910.1 dated Aug. 12, 2021 with English trasnlation (12 pages).

* cited by examiner

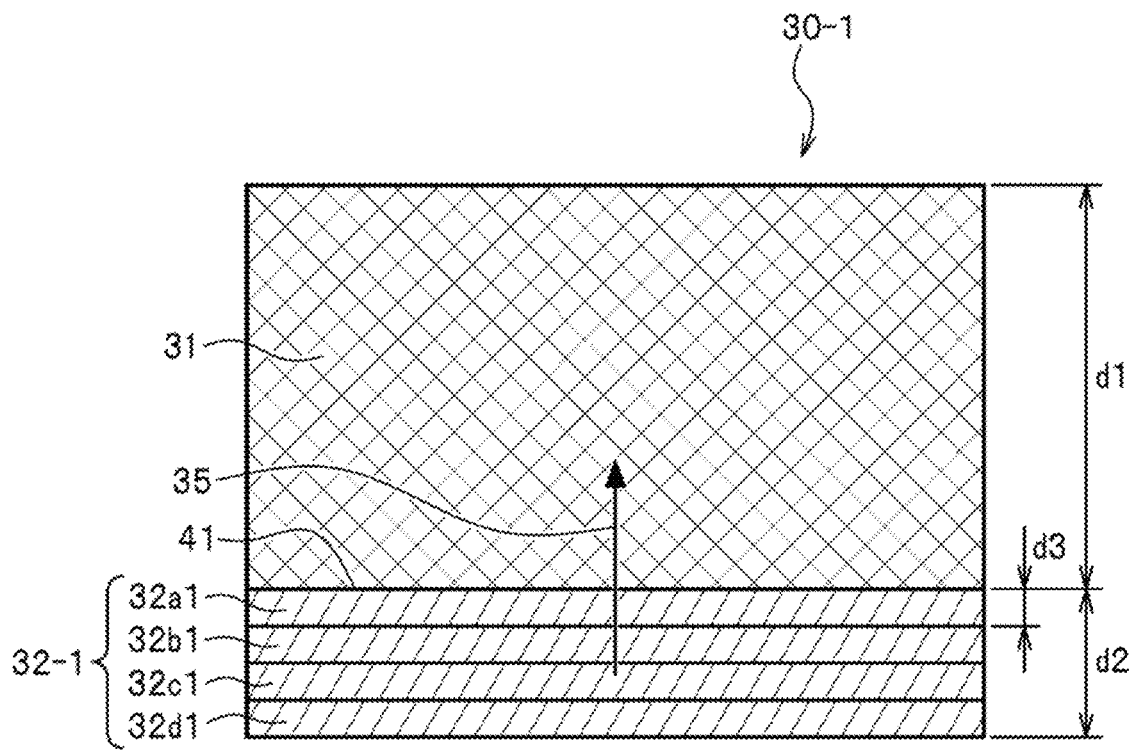
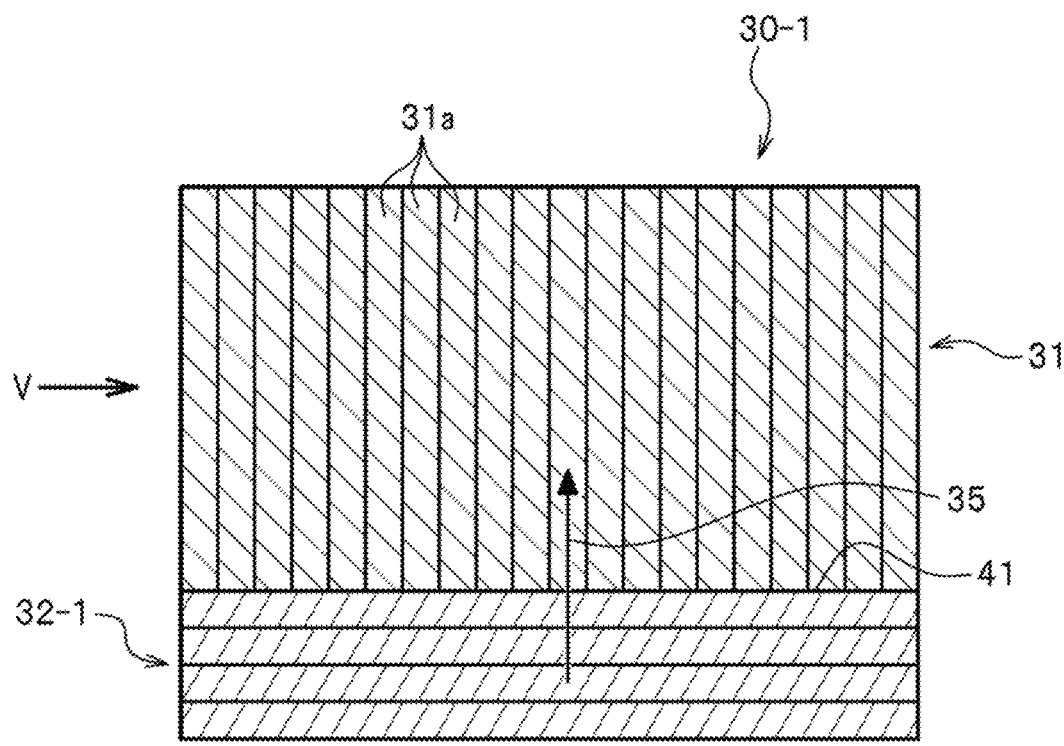

ROTARY ELECTRIC MACHINE AND VEHICLE EQUIPPED WITH ROTARY ELECTRIC MACHINE

CROSS-REFERENCE TO RELATED APPLICATION

This application claims the benefit of foreign priority to Japanese Patent Application No. JP2018-198871, filed Oct. 23, 2018, which is incorporated by reference in its entirety.

TECHNICAL FIELD

The present invention relates to a rotary electric machine which can achieve highly efficient operation, and a vehicle equipped with the rotary electric machine.

BACKGROUND ART

In an effort to realize low carbon society, various types of vehicles equipped with a rotary electric machine have become widespread in recent years; such vehicles (i.e., hybrid electric vehicles and electric vehicles) are equipped with a rotary electric machine as a prime mover, in addition to or in place of a conventional internal combustion engine.

The rotary electric machine includes an annular stator and an annular rotor. The stator includes a stator core having a plurality of slots, and stator coils respectively provided in the corresponding slots. The rotor is rotatably provided in the stator opposite to an inner circumferential wall of the stator with a slight gap present therebetween. A plurality of permanent magnets are disposed in a rotor core of the rotor at fixed intervals in the circumferential direction.

In the rotary electric machine, when a motor current flows through a stator coil, a revolving field is generated in the stator. The revolving field thus generated in the stator and magnetic fields generated in the rotor by the permanent magnets disposed in the rotor core interact to cause the rotor to rotate. To address lower power consumption, it is strongly desired that the rotary electric machine be operated highly efficiently (at high output) with appropriate rotation speed and torque in accordance with the operating conditions.

JP2017-158282A discloses a rotary electric machine, which comprises a stator having a hollow portion, and a rotor rotatably provided in the hollow portion of the stator. The rotor has a plurality of insertion holes for magnets, and magnets are received in the corresponding insertion holes. The inner wall of each insertion hole has a center-side wall surface portion located closer to the radially center of the rotor, and a periphery-side wall surface portion remote opposite to the center-side wall surface and located far from the radially center of the rotor. A pair of lugs jut out from the center-side wall surface portion toward the magnet to engage with a pair of grooves formed in the magnet. Further, a pair of recess portions are formed in the center-side wall surface portion at positions continuous to root portions of the lugs, so that gaps are formed between the magnet and the center-side wall portion at the recess portions. In this rotary electric machine disclosed in JP2017-158282A, the magnets are held in the insertion holes by the lugs, while being spaced apart from the periphery-side wall surface portions. This configuration makes it possible to improve the degree of flexibility in designing the shape of the outer peripheral side wall of the rotor and to efficiently improve the usability of magnetic flux of the magnets without deteriorating the durability of the rotor.

SUMMARY

The rotary electric machine disclosed in JP2017-158282A includes the lugs for holding and positioning the permanent magnets. However, a permanent magnet expands in a direction orthogonal to the magnetization direction due to decreased temperature of the permanent magnet, so that the pair of lugs disposed outside the permanent magnet are subjected to stress. For this reason, to disperse the stress applied to the lugs, a pair of cold thermal stress relieving portions each having a large radius of curvature are formed in the center-side wall surface portion at positions where the lugs contact the permanent magnet.

However, providing the cold thermal stress relieving portions having a large radius of curvature requires large gaps in the center-side wall surface portion. Further, provision of the gaps prevents magnetic flux paths from passing through the gaps, and this will disadvantageously cause a decrease in torque.

In view of the above, the present invention seeks to provide a rotary electric machine, which can prevent the lugs from damaging and which can enhance torque density and demagnetization resistance, while ensuring the magnetic flux paths. The present invention also seeks to provide a vehicle equipped with such a rotary electric machine.

The present invention proposed to attain the above object provides a rotary electric machine comprising: an annular stator including a stator core and coils disposed in the stator core; and an annular rotor disposed inside the stator and opposite to an inner circumferential wall of the stator with a gap present therebetween, the rotor including a rotor core having a plurality of receiving holes for magnetic material members, which receiving holes extend in an axial direction of a drive shaft and are arranged in a circumferential direction of the rotor core, wherein the rotor includes a plurality of protrusions provided in each of the plurality of receiving holes, the protrusions jutting out from an inner wall of the receiving hole to hold a corresponding magnetic material member, wherein each of the magnetic material members comprises a hard magnetic material member and a soft magnetic material member, which are stacked one on another in a magnetization direction, and wherein the soft magnetic material member is disposed to border the inner wall of the receiving hole at positions where the protrusions are provided.

BRIEF DESCRIPTION OF THE DRAWINGS

FIG. 3 is an enlarged front view illustrating a first stacked structure of a soft magnetic material member constituting a magnetic material member that has a magnet-magnetic flux generation property at the magnetic pole portion shown in FIG. 2.

FIG. 4 is an enlarged front view illustrating a stacked structure of a hard magnetic material member constituting the magnetic material member shown in FIG. 3.

DETAILED DESCRIPTION OF THE INVENTION

Figure 1:
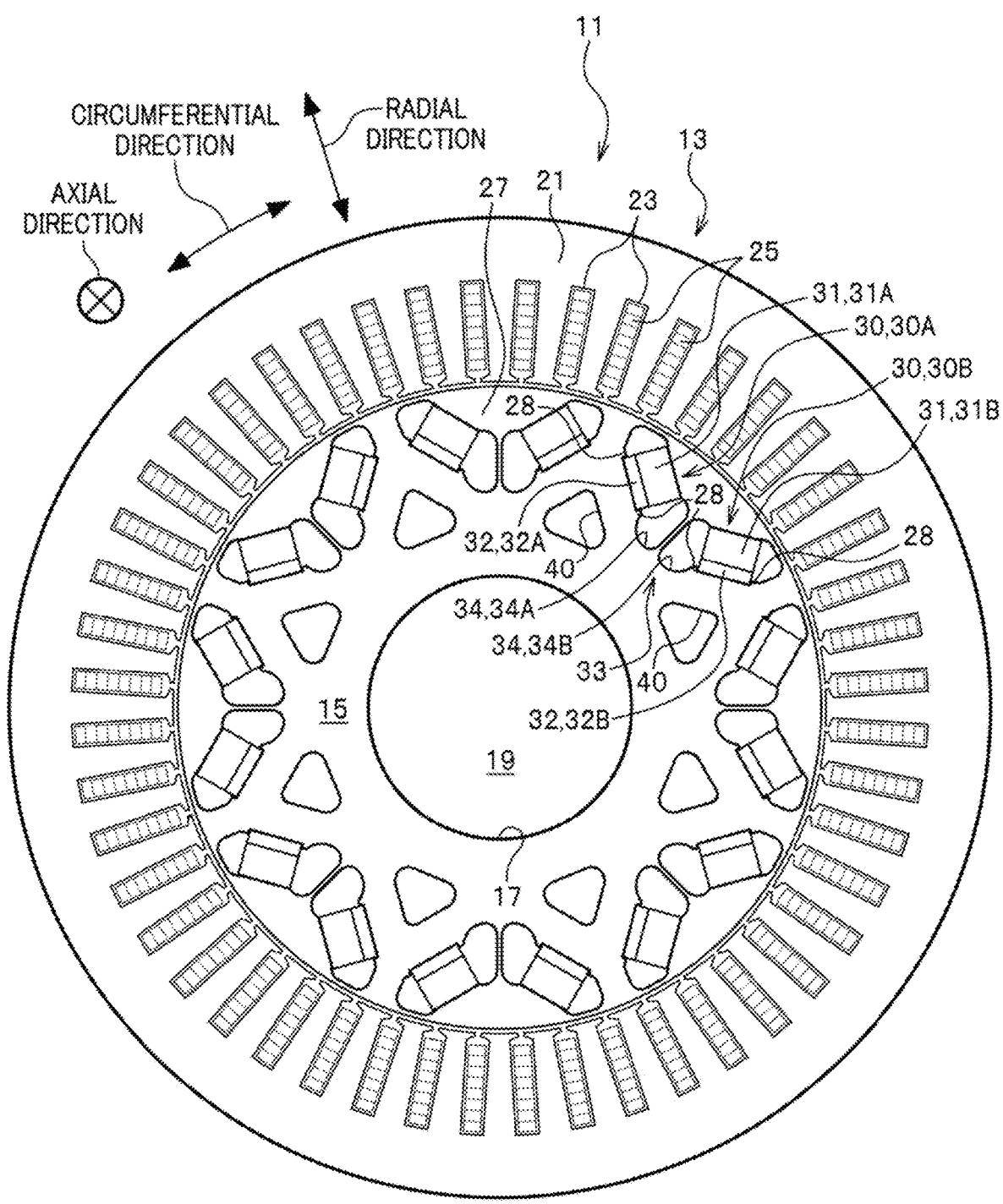
FIG. 1 is a front view of a rotary electric machine according to one embodiment of the present invention.

One embodiment of the present invention will be described in detail with reference to the drawings where necessary. In the drawings, same or similar parts are indicated by same reference numerals, and duplicated explanation thereof will be omitted. Further, the size or the shape of each of the constituent elements may be modified or exaggerated in a schematic manner for the purposes of explanation.

Overall Structure of Rotary Electric Machine 11

Figure 2:
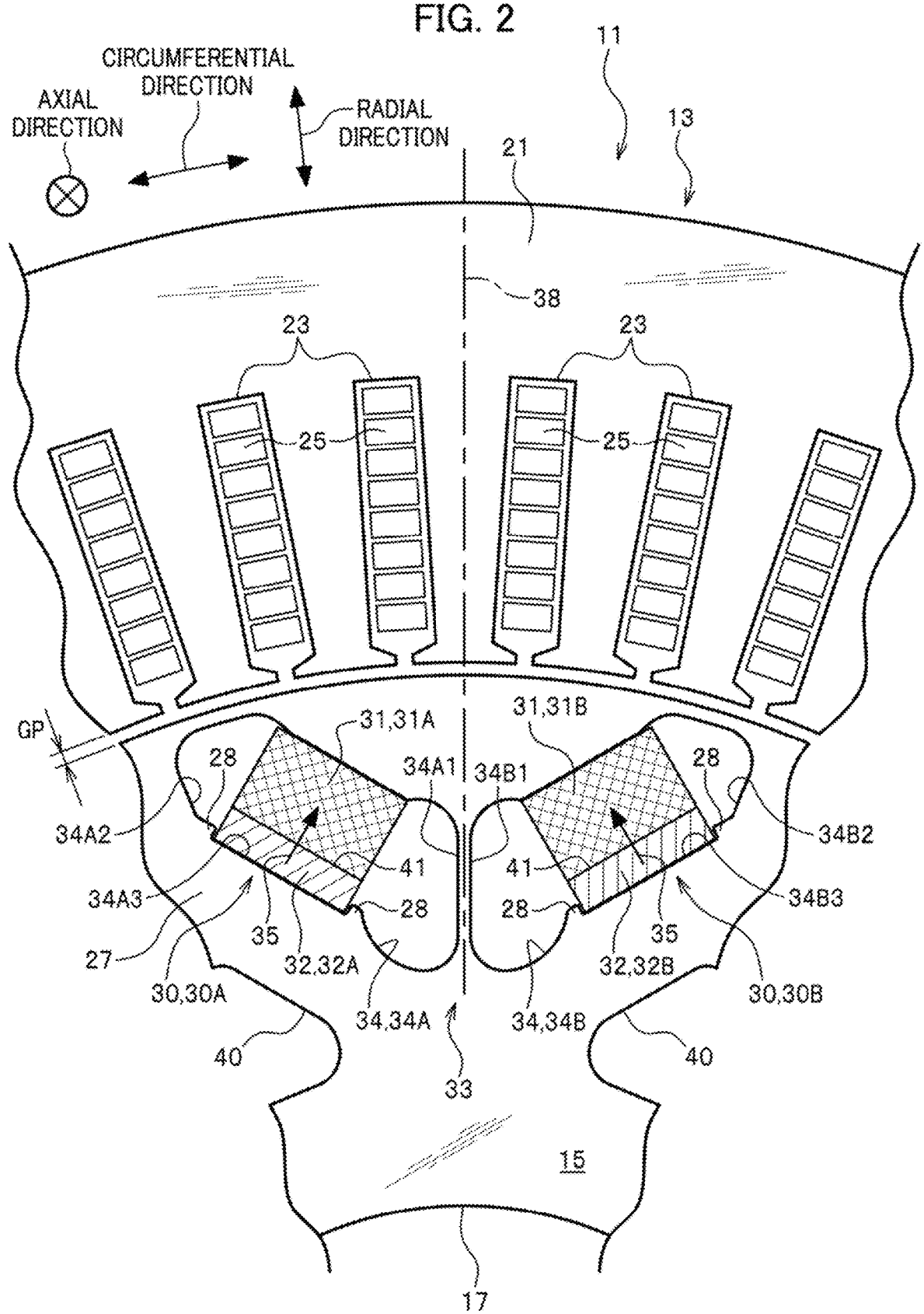
FIG. 2 is an enlarged view illustrating a structure around a magnetic pole portion provided in a rotor of the rotary electric machine shown in FIG. 1.

FIG. 1 is a front view of a rotary electric machine 11 according to one embodiment of the present invention. FIG. 2 is an enlarged view illustrating a structure around a magnetic pole portion 33 provided in a rotor 15 of the rotary electric machine 11 shown in FIG. 1.

In this embodiment, lugs (protrusions 28) are provided on an inner-side wall surface portion of a receiving hole 34 at positions inward of a magnetic material member in a radial direction of the rotor 15.

As seen in FIG. 1, the rotary electric machine 11 according to this embodiment includes an annular stator 13 and an annular rotor 15. The stator 13 includes a stator core 21 and coils disposed in the stator core 21. The rotor 15 is disposed inside the stator 13 and opposite to an inner circumferential wall of the stator 13 with a gap present therebetween, and the rotor 15 includes a rotor core 27 having a plurality of receiving holes 34 for magnetic material members, which receiving holes 34 extend in an axial direction of a drive shaft and are arranged in a circumferential direction of the rotor core 27.

To be more specific, the stator 13 includes the stator core 21, a plurality of slots 23 formed in the stator core 21, and stator coils 25 respectively disposed in the corresponding slots 23.

The stator core 21 is shaped as a circular cylinder as a whole. The stator core 21 may be made, for example, by stacking in the axial direction a plurality of magnetic steel sheets in the form of a disc.

As seen in FIG. 2, the rotor 15 is disposed inside the stator 13 and opposite to the inner circumferential wall of the stator 13 with a slight gap GP present therebetween.

As seen in FIGS. 1 and 2, the rotor 15 includes the rotor core 27 and the magnetic pole portions 33. A through-hole 17 having a circular cylindrical inner wall is formed in the rotor core 27. A rotary shaft 19 is fitted into the through-hole 17 of the rotor core 27 so that the outer circumferential surface of the rotary shaft 19 is joined to the inner circumferential surface of the through-hole 17. Accordingly, the rotary shaft 19 is fitted into and fixed to the through-hole 17 of the rotor core 27.

As with the stator core 21, the rotor core 27 may be formed, for example, by stacking in the axial direction a plurality of magnetic steel sheets in the form of a disc.

The rotor core 27 includes a plurality of magnetic pole portions 33 disposed at regular intervals along a circumferential direction of the rotor core 27; each magnetic pole portion 33 includes a pair of magnetic material members 30 extending straight in the axial direction. Further, the rotor core 27 has plural pairs of receiving holes 34 for receiving the magnetic material members 30; the receiving holes 34 provided in pair are arranged at predetermined intervals along the circumferential direction. An inner wall of each receiving hole 34 has an inner-side wall surface portion located closer to a radially center of the rotor 15, and an outer-side wall surface portion located closer to an outer wall of the rotor 15 in the radial direction. The inner-side wall surface portion and the outer-side wall surface portion face each other (in particular, the inner-side wall surface portion and the outer-side wall surface portion are substantially parallel to each other in this embodiment). Configuration of the receiving holes 34 will be described later.

The rotor core 27 includes a pair of (i.e., a plurality of) protrusions 28 provided in each of the plurality of receiving holes 34; the protrusions 28 jut out inward from an inner wall (inner-side wall surface portion) of the receiving hole 34 toward the center of the receiving hole 34 to hold a corresponding magnetic material member 30. The protrusions 28 correspond to lugs for holding and positioning the magnetic material member 30.

It should be noted that the rotary electric machine 11 according to this embodiment does not include (and thus not shown in the figures) a pair of cold thermal stress relieving portions (provided for the purpose of dispersing the stress applied to the magnetic material member 30; see also cold thermal stress relieving portions 129 as shown in the comparative example of FIG. 14 to be described later) that are formed in the conventional rotary electric machine in the inner wall of the receiving hole 34 at positions where the protrusions 28 contact the magnetic material member 30.

Further, generally triangular-shaped hollow portions 40 are formed in the rotor core 27 along the entire length thereof in the axial direction (see FIG. 2).

Magnetic Material Member 30

The magnetic material member 30 is made of a rod-like magnetic member having a substantially rectangular transverse cross section. The length of the magnetic material member 30 is substantially the same as the entire length of the rotor 15 in the axial direction.

As seen in FIGS. 1 and 2, the magnetic material member 30 consists of a hard magnetic material member 31 (i.e., permanent magnet) and a soft magnetic material member 32 (low saturation magnetization material).

The hard magnetic material member 31 is made of a hard magnetic substance. Although the hard magnetic substance is not limited to a specific material, for example, a rare earth magnet, such as a neodymium magnet having high magnetic property and capable of achieving high torque density for instance, may be employed appropriately.

The soft magnetic material member 32 is made of a soft magnetic substance. The soft magnetic substance exhibits saturation magnetization lower than the residual flux density Br of (the hard magnetic substance of) the hard magnetic material member 31. Further, the soft magnetic substance exhibits the maximum magnetic permeability higher than the maximum magnetic permeability of the magnetic steel sheet from which the rotor 15 is formed. For example, a permalloy may be used as the soft magnetic substance. Arrangement and structure of the hard magnetic material member 31 and the soft magnetic material member 32 will be described later in detail.

The rotary electric machine 11 is configured such that the rotor 15 includes a pair of (i.e., a plurality of) protrusions 28 provided in each of the plurality of receiving holes 34 and the protrusions 28 jut out from an inner wall of the receiving hole 34 to hold a corresponding magnetic material member 30, that each of the magnetic material members 30 consists of the hard magnetic material member 31 and the soft magnetic material member 32, which are stacked one on another in a magnetization direction, and that the soft magnetic material member 32 is disposed to border the inner wall between the pair of protrusions 28.

Further, it is preferable that the thickness of the soft magnetic material member 32 in the direction of magnetization is greater than the thickness of each of the protrusions 28 (lugs) in the direction of magnetization.

According to the embodiment shown in FIGS. 1 and 2, one magnetic pole portion 33 is made by combining a pair of first magnetic material member 30A and second magnetic material member 30B.

The first magnetic material member 30A consists of a first hard magnetic material member 31A and a first soft magnetic material member 32A. On the other hand, the second magnetic material member 30B consists of a second hard magnetic material member 31B and a second soft magnetic material member 32B.

As will be described later, the first magnetic material member 30A and the second magnetic material member 30B may be formed to have a first stacked structure, a second stacked structure, or a third stacked structure. For example, the first soft magnetic material member 32A of the first magnetic material member 30A and the second soft magnetic material member 32B of the second magnetic material member 30B may have either one of the first stacked structure, the second stacked structure, and the third stacked structure.

Hereinafter, the first magnetic material member 30A and the second magnetic material member 30B are collectively referred to as a "magnetic material member 30" in a simple manner, the first hard magnetic material member 31A and the second hard magnetic material member 31B are collectively referred to as a "hard magnetic material member 31" in a simple manner, and the first soft magnetic material member 32A and the second soft magnetic material member 32B are collectively referred to as a "soft magnetic material member 32" in as simple manner.

As seen in FIG. 2, a pair of first magnetic material member 30A and second magnetic material member 30B are disposed symmetrically about a center line 38 extending in the radial direction such that they are inclined outward in the radial direction (see FIG. 2) to form a substantially V-shaped pattern.

To receive the pair of first magnetic material member 30A and second magnetic material member 30B, as seen in FIGS. 1 and 2, a first receiving hole 34A and a second receiving hole 34B are formed in the rotor 15. As with the pair of first and second magnetic material members 30A, 30B, the first receiving hole 34A and the second receiving hole 34B are disposed symmetrically about the center line 38 such that they are inclined outward in the radial direction (see FIG. 2) to form a substantially V-shaped pattern.

Further, as seen in FIG. 1, the plurality of receiving holes 34 (i.e., first receiving holes 34A and second receiving holes 34B) are disposed symmetrically about the center of the rotor core 27.

The first receiving hole 34A includes a first inner gap portion 34A1 located closer to the center line 38 as shown in FIG. 2, a first outer gap portion 34A2 located radially outward of the first inner gap portion 34A1, and a first receiving portion 34A3 disposed between the first inner gap portion 34A1 and the first outer gap portion 34A2 and configured to receive the first magnetic material member 30A. The first inner gap portion 34A1, the first outer gap portion 34A2, and the first receiving portion 34A3 are in communication with each other to form a continuous and integral hole.

Similar to the first receiving hole 34A, the second receiving hole 34B includes a second inner gap portion 34B1 located closer to the center line 38 as shown in FIG. 2, a second outer gap portion 34B2 located radially outward of the second inner gap portion 34B1, and a second receiving portion 34B3 disposed between the second inner gap portion 34B1 and the second outer gap portion 34B2 and configured to receive the second magnetic material member 30B. The second inner gap portion 34B1, the second outer gap portion 34B2, and the second receiving portion 34B3 are in communication with each other to form a continuous and integral hole.

Hereinafter, the first receiving hole 34A and the second receiving hole 34B are collectively referred to as a "receiving hole 34" in a simple manner, and the first receiving portion 34A3 and the second receiving portion 34B3 are collectively referred to as a "receiving portion 34-3".

The magnetic material member 30 is received in the receiving portion 34-3 of the receiving hole 34, and is fixed, for example, by adhesive (not shown), to a radially inner wall surface of the receiving portion 34-3 (i.e., the inner-side wall surface portion of the inner wall of the receiving hole 34 that is located between the pair of protrusions 28) (see FIG. 2).

A pair of magnetic material members 30 constitute one magnetic pole portion 33. The magnetic polarity of the pair of magnetic material members 30 are set such that radially outer sides of the pair of magnetic material members 30 have the same polarity and that adjacent magnetic pole portions 33 have opposite polarity.

The hard magnetic material member 31 of the magnetic material member 30 has a direction of easy magnetization along which magnetization occurs easily, and a direction of hard magnetization along which magnetization does not occur easily. In the example shown in FIG. 2, the direction of easy magnetization 35 of each hard magnetic material member 31 (see the arrows in FIG. 2) is oriented in a radially outward direction of the rotor 15.

The hard magnetic material member 31 constituting the magnetic material member 30 has a one side surface 41 intersecting the direction of easy magnetization 35. As seen in FIGS. 2 and 3-12, the soft magnetic material member 32 is fixed to the one side surface 41 of the hard magnetic material member 31 by adhesive (not shown). As described above, the soft magnetic material member 32 exhibits the saturation magnetization lower than the residual flux density of the hard magnetic material member 31, and exhibits the maximum magnetic permeability higher than the maximum magnetic permeability of the magnetic steel sheet from which the rotor 15 is formed.

Accordingly, the soft magnetic material member 32 serves to decrease the magnet-magnetic flux of the hard magnetic material member 31.

Stacked Structure of Magnetic Material Member 30

Figure 5:
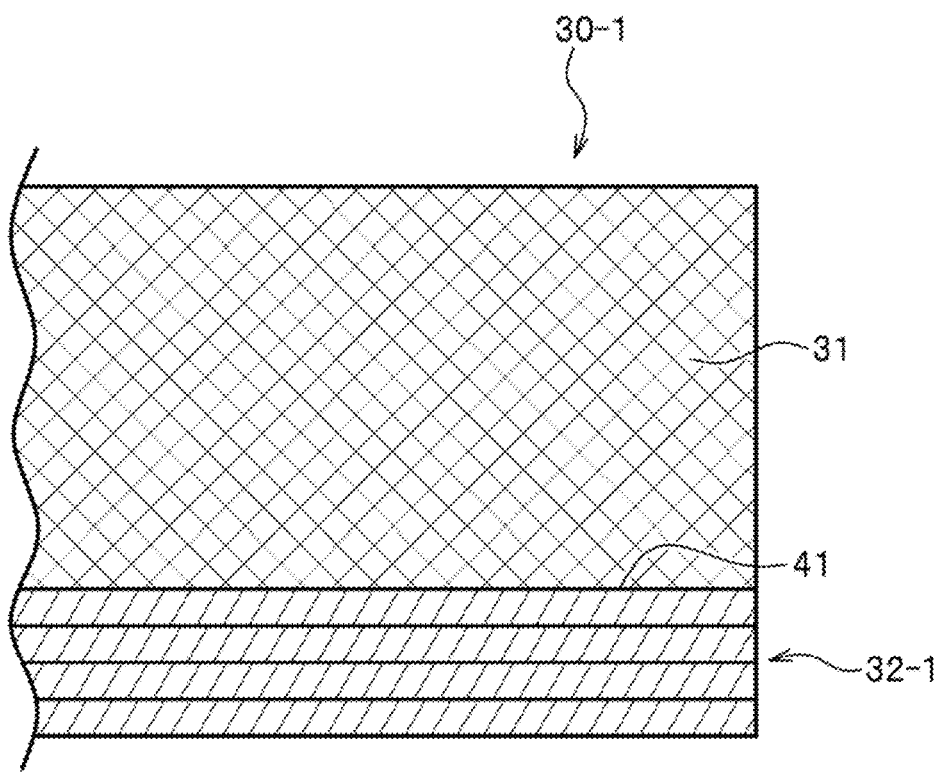
FIG. 5 is an enlarged side view of the magnetic material member as viewed from the direction indicated by the arrow in FIG. 4.
Figure 6:
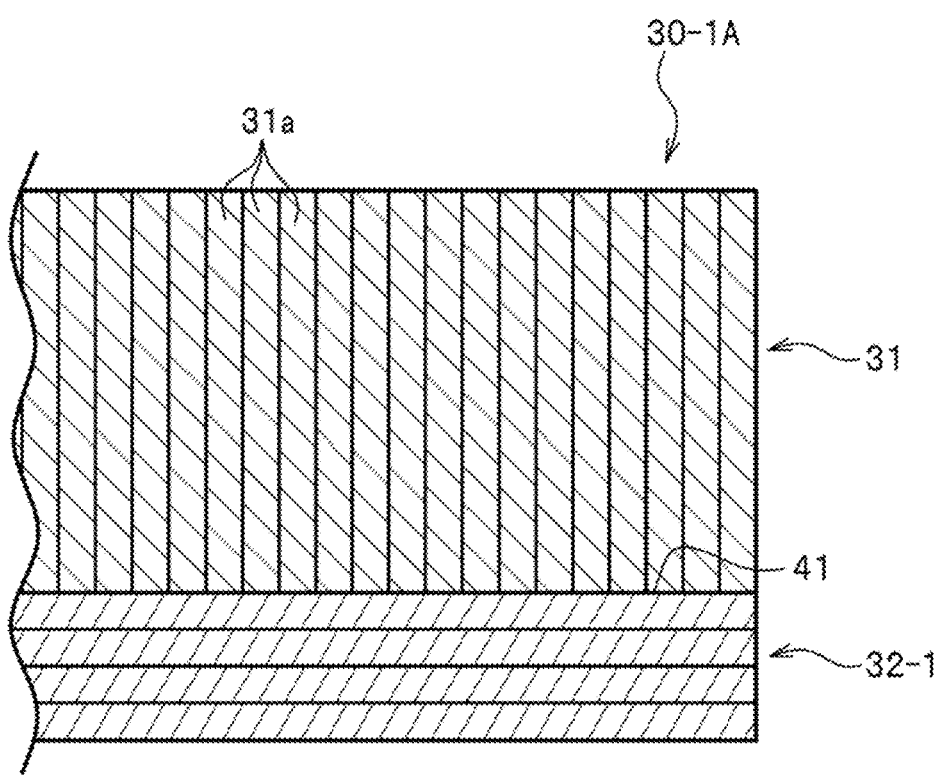
FIG. 6 is an enlarged side view illustrating a modification of the magnetic material member shown in FIG. 5.

FIG. 3 is an enlarged front view illustrating a first stacked structure 32-1 of the soft magnetic material member 32 constituting the magnetic material member 30 that has a magnet-magnetic flux generation property at the magnetic pole portion 33 shown in FIG. 2. FIG. 4 is an enlarged front view illustrating a stacked structure of the hard magnetic material member 31 constituting the magnetic material member 30 shown in FIG. 3. FIG. 5 is an enlarged side view of the magnetic material member 30 as viewed from the direction indicated by the arrow in FIG. 4. Further, FIG. 6 is an enlarged side view illustrating a modification of the magnetic material member 30 shown in FIG. 5.

Figure 7:
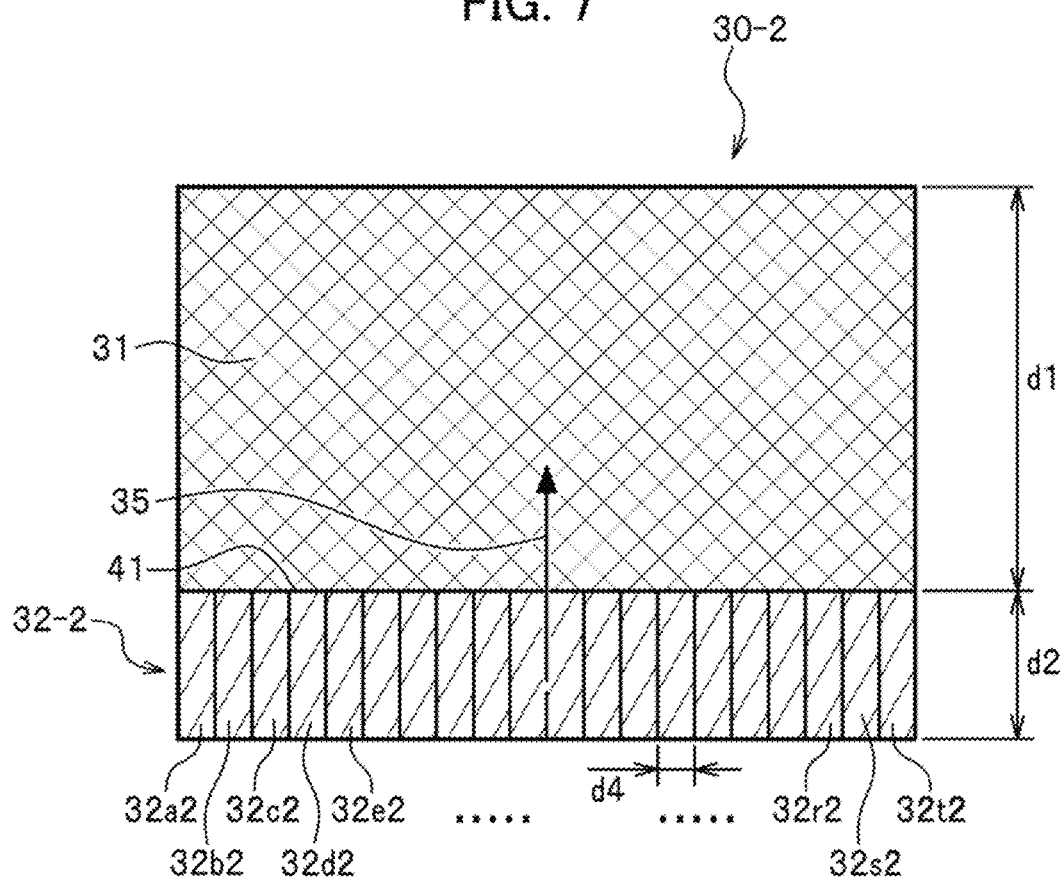
FIG. 7 is an enlarged front view illustrating a second stacked structure of the soft magnetic material member constituting the magnetic material member that has a magnet-magnetic flux generation property at the magnetic pole portion shown in FIG. 2.
Figure 8:
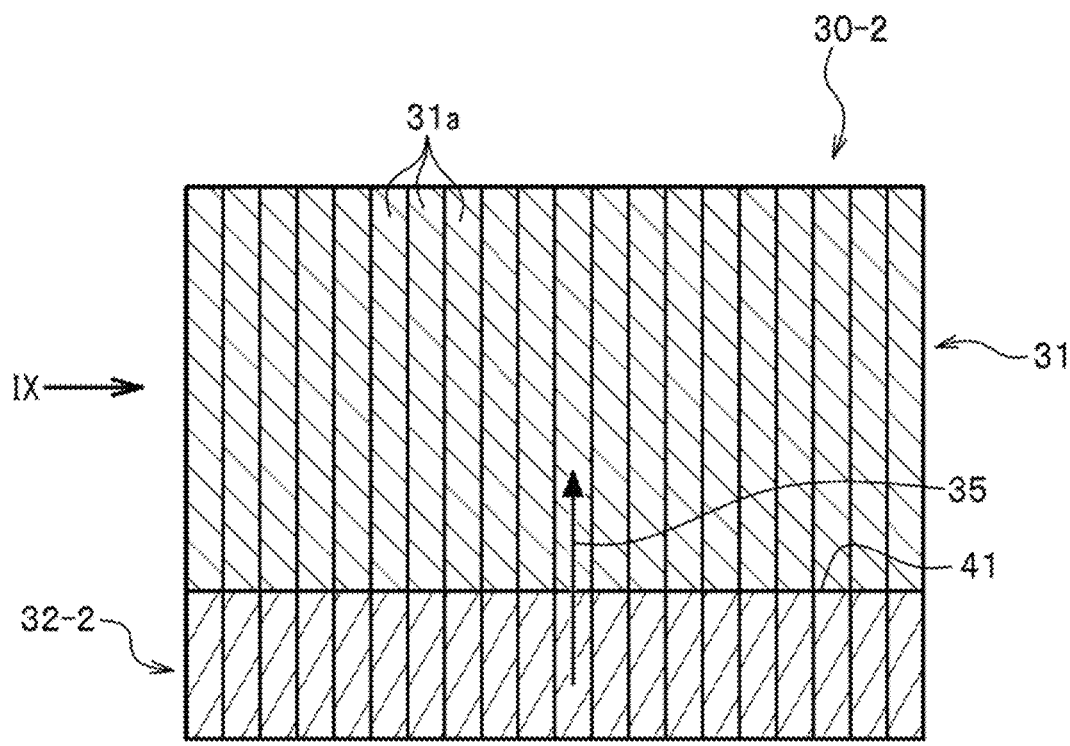
FIG. 8 is an enlarged front view illustrating a stacked structure of the hard magnetic material member constituting the magnetic material member shown in FIG. 7.
Figure 9:
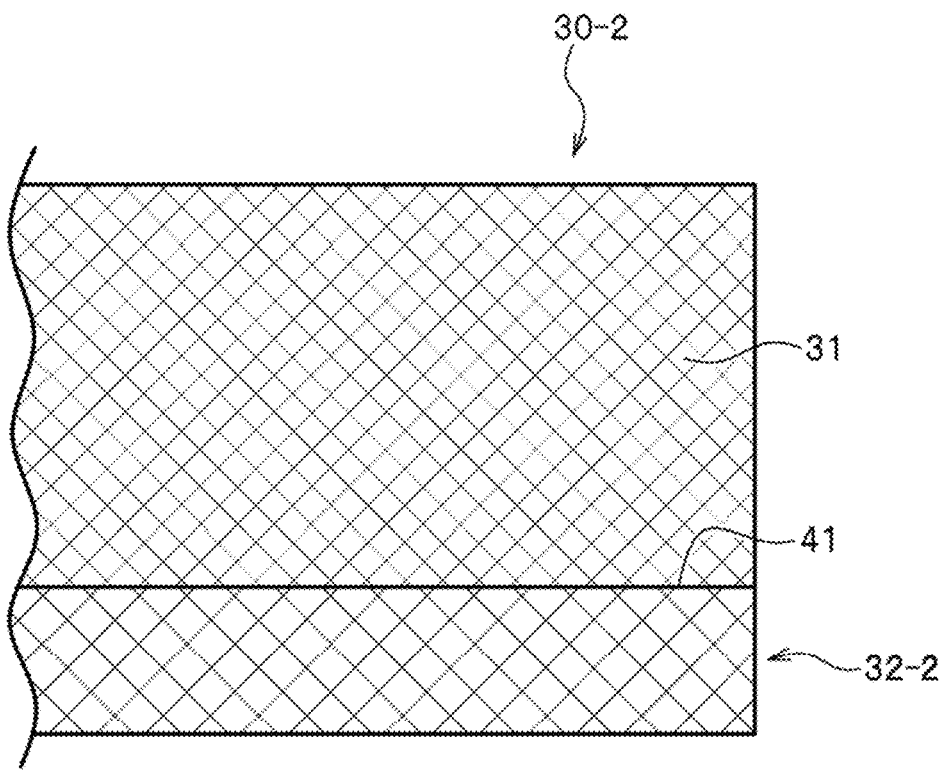
FIG. 9 is an enlarged side view of the magnetic material member as viewed from the direction indicated by the arrow in FIG. 8.
Figure 10:
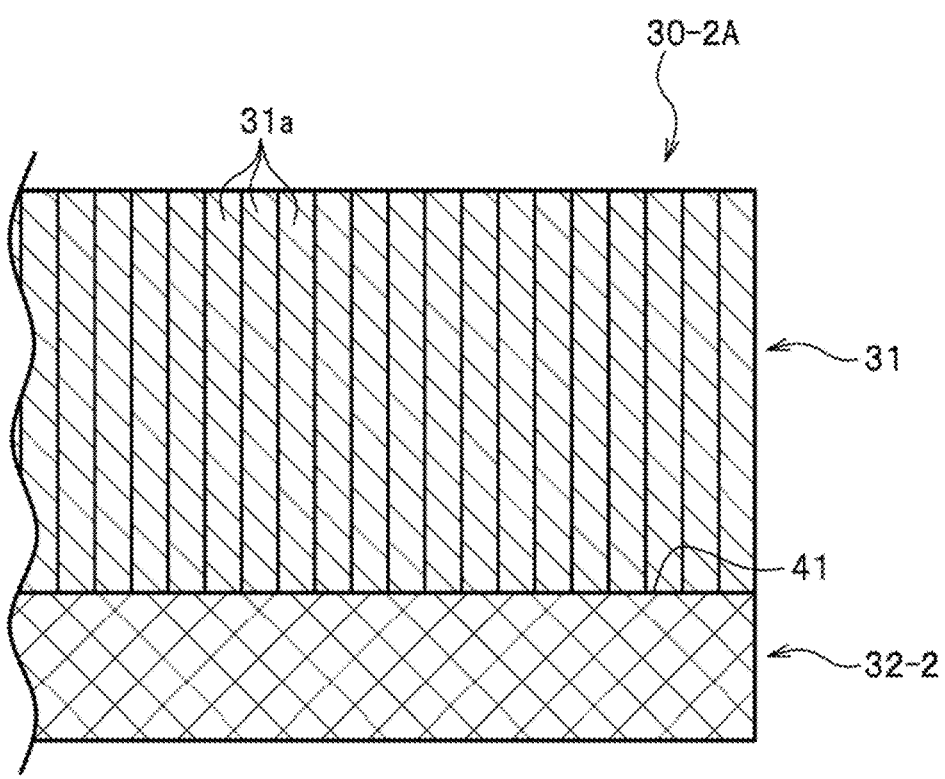
FIG. 10 is a side view illustrating a modification of the magnetic material member shown in FIG. 9.
Figure 11:
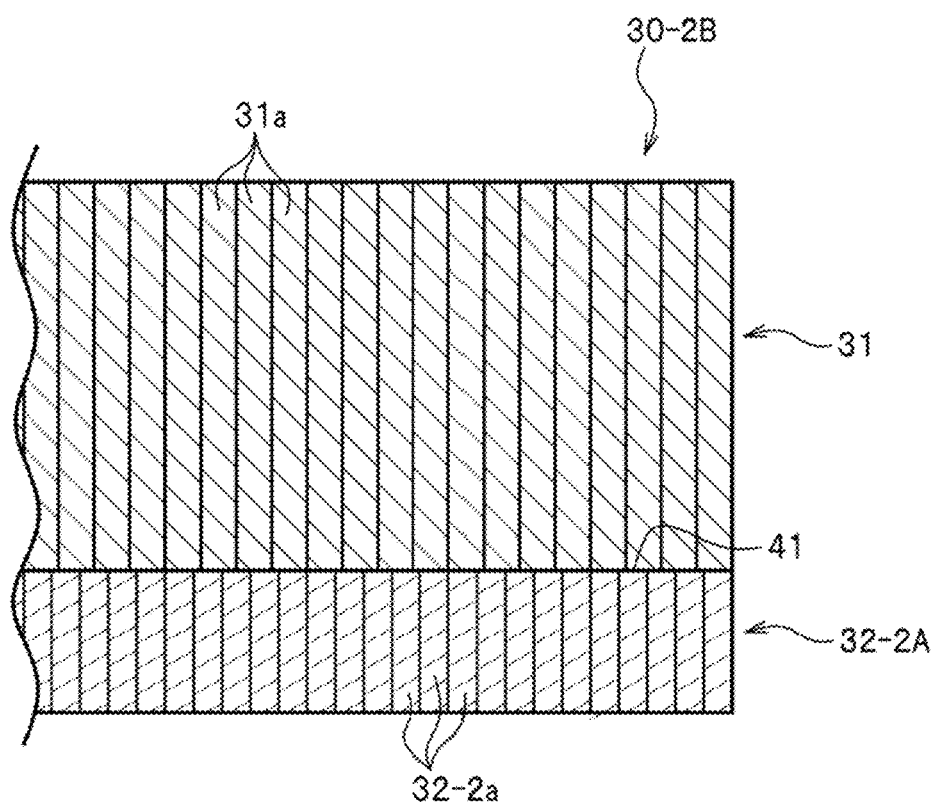
FIG. 11 is an enlarged side view illustrating a modification of the magnetic material member shown in FIG. 10.
Figure 12:
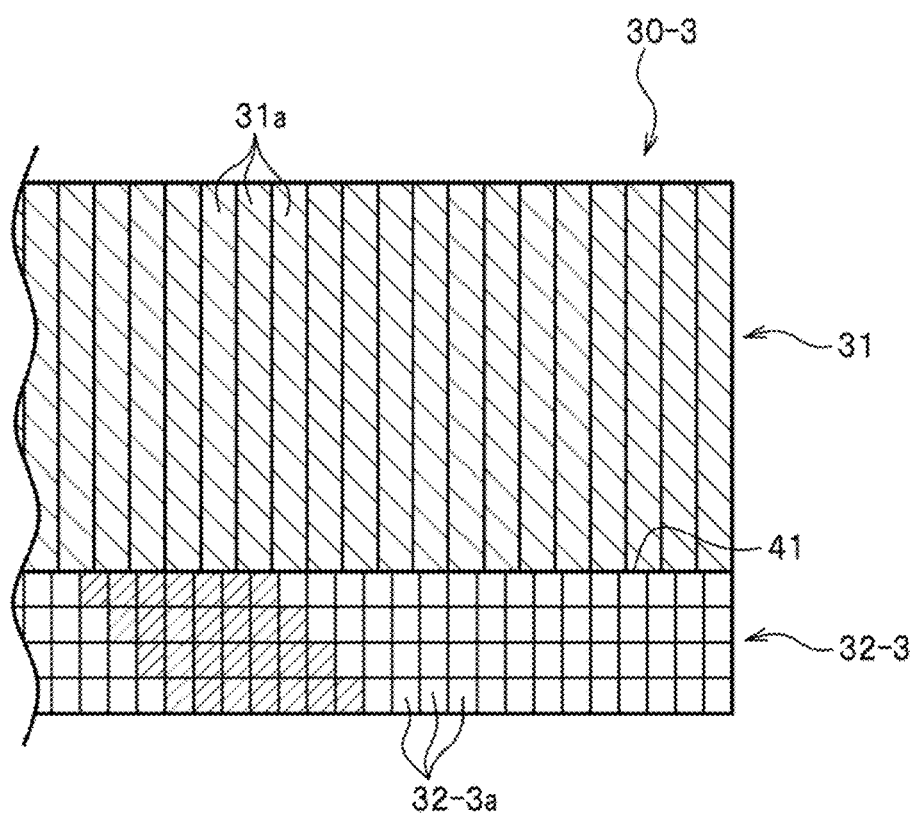
FIG. 12 is an enlarged front view illustrating a third stacked structure of the soft magnetic material member constituting the magnetic material member that has a magnet-magnetic flux generation property at the magnetic pole portion shown in FIG. 2.

FIG. 7 is an enlarged front view illustrating a second stacked structure 32-2 of the soft magnetic material member 32 constituting the magnetic material member 30 that has a magnet-magnetic flux generation property at the magnetic pole portion 33 shown in FIG. 2. FIG. 8 is an enlarged front view illustrating a stacked structure of the hard magnetic material member 31 constituting the magnetic material member 30 shown in FIG. 7. FIG. 9 is an enlarged side view of the magnetic material member 30 as viewed from the direction indicated by the arrow in FIG. 8. FIG. 10 is a side view illustrating a modification of the magnetic material member 30 shown in FIG. 9. FIG. 11 is an enlarged side view illustrating a modification of the magnetic material member 30 shown in FIG. 10. FIG. 12 is an enlarged front view illustrating a third stacked structure 32-3 of the soft magnetic material member 32 constituting the magnetic material member 30 that has a magnet-magnetic flux generation property at the magnetic pole portion 33 shown in FIG. 2.

As seen in FIGS. 3 and 7, the height d1 of the hard magnetic material member 31 in the direction of easy magnetization 35 is set to be higher than the height d2 of the soft magnetic material member 32 in the direction of easy magnetization 35. The direction of easy magnetization corresponds to the "direction of magnetization" of the claims.

The soft magnetic material member 32 constituting the magnetic material member 30 may be in the form of a soft magnetic material member 32-1 that takes on a first stacked structure (see FIGS. 3-6), a soft magnetic material member 32-2 that takes on a second stacked structure (see FIGS. 7-11), or a soft magnetic material member 32-3 that takes on a third stacked structure (see FIG. 12) for instance.

Magnetic Material Member 30-1 with First Stacked Structure

As seen in FIG. 3, a magnetic material member 30-1 includes a soft magnetic material member 32-1 that takes on a first stacked structure. To be more specific, the magnetic material member 30-1 is configured such that the soft magnetic material member 32-1 having the first stacked structure is provided on the one side surface 41 of the hard magnetic material member 31; the one side surface 41 extends in a direction intersecting the direction of easy magnetization 35. The magnetic material member 30-1 may be adopted for the first magnetic material member 30A and the second magnetic material member 30B.

As seen in FIG. 3, the soft magnetic material member 32-1 constituting the magnetic material member 30-1 is made by stacking in the direction of easy magnetization 35 plural layers of flat board-like soft magnetic substance members $32a1$, $32b1$, $32c1$, $32d1$. The plurality of soft magnetic substance members $32a1$, $32b1$, $32c1$, $32d1$ have the same height d3. The plurality of soft magnetic substance members $32a1$, $32b1$, $32c1$, $32d1$ are bonded together by adhesive (not shown).

The hard magnetic material member 31 constituting the magnetic material member 30-1 is made by stacking in a width direction (indicated by the arrow V in FIG. 4) orthogonal to the direction of easy magnetization 35 plural layers of flat board-like hard magnetic substance members $31a$. The plurality of hard magnetic substance members $31a$ have the same width. The plurality of hard magnetic substance members $31a$ are bonded together by adhesive (not shown).

As seen in FIG. 5, the hard magnetic material member 31 constituting the magnetic material member 30-1 is elongated in the axial direction.

As a modification of the magnetic material member 30-1, as seen in FIG. 6, the hard magnetic material member 31 may be made by stacking in the axial direction plural layers of flat board-like hard magnetic substance members $31a$.

Magnetic Material Member 30-2 with Second Stacked Structure

As seen in FIG. 7, a magnetic material member 30-2 includes a soft magnetic material member 32-2 that takes on a second stacked structure. To be more specific, the magnetic material member 30-2 is configured such that the soft magnetic material member 32-2 having the second stacked structure is provided on the one side surface 41 of the hard magnetic material member 31; the one side surface 41 extends in a direction intersecting the direction of easy magnetization 35. The magnetic material member 30-2 may be adopted for the first magnetic material member 30A and the second magnetic material member 30B.

As seen in FIG. 7, the soft magnetic material member 32-2 constituting the magnetic material member 30-2 is made by stacking in a direction orthogonal to the direction of easy magnetization 35 plural layers of flat board-like soft magnetic substance members $32a2$, $32b2$, $32c2$, $32s2$, $32t2$. The plurality of soft magnetic substance members $32a2$, $32b2$, $32c2$, $32s2$, $32t2$ have the same width d4. The plurality of soft magnetic substance members $32a2$, $32b2$, $32c2$, $32s2$, $32t2$ are bonded together by adhesive (not shown).

The hard magnetic material member 31 constituting the magnetic material member 30-2 is made by stacking in a width direction (indicated by the arrow IX in FIG. 8) orthogonal to the direction of easy magnetization 35 plural layers of flat board-like hard magnetic substance members 31*a*. The plurality of hard magnetic substance members 31*a* have the same width. The plurality of hard magnetic substance members 31*a* are bonded together by adhesive (not shown).

As seen in FIG. 9, the hard magnetic material member 31 constituting the magnetic material member 30-2 is elongated in the axial direction.

As a modification of the magnetic material member 30-2, as seen in FIG. 10, the hard magnetic material member 31 may be made by stacking in the axial direction plural layers of flat board-like hard magnetic substance members 31*a*.

Further, as a modification of the magnetic material member 30-2 shown in FIG. 10, as seen in FIG. 11, the magnetic material member 30-2B may be configured such that the soft magnetic material member 32-2A is made by stacking in the axial direction plural layers of rectangular board-like soft magnetic substance members 32-2*a*; the plurality of rectangular board-like soft magnetic substance members 32-2*a* have a thickness thinner than that of the soft magnetic substance members 32*a*2, 32*b*2, 32*c*2, 32*s*2, 32*t*2 shown in FIG. 7.

Magnetic Material Member 30-3 with Third Stacked Structure

As seen in FIG. 12, a magnetic material member 30-3 includes a soft magnetic material member 32-3 that takes on a third stacked structure. To be more specific, the magnetic material member 30-3 is configured such that the soft magnetic material member 32-3 having the third stacked structure is provided on the one side surface 41 of the hard magnetic material member 31; the one side surface 41 extends in a direction intersecting the direction of easy magnetization 35. The third stacked structure is a combination of the first stacked structure and the second stacked structure of the soft magnetic material member 32. The magnetic material member 30-3 may be adopted for the first magnetic material member 30A and the second magnetic material member 30B.

As seen in FIG. 12, the soft magnetic material member 32-3 constituting the magnetic material member 30-3 is made by stacking a plurality of rectangular prism-shaped soft magnetic substance members 32-3*a* in the axial direction and in the direction of easy magnetization 35; as compared with the soft magnetic material member 32-1 having the first stacked structure and the soft magnetic material member 32-2 having the second stacked structure, the soft magnetic material member 32 can be divided in the axial direction and in the direction of easy magnetization 35 to provide the soft magnetic material member 32-3 consisting of the plurality of rectangular prism-shaped soft magnetic substance members 32-3*a*. The plurality of soft magnetic substance members 32-3*a* have the same size in both height and length in the axial direction. The plurality of soft magnetic substance members 32-3*a* are bonded together by adhesive (not shown).

Overall Structure of Rotary Electric Machine 111 According to Comparative Embodiment With reference to FIGS. 13 and 14, the overall structure of a rotary electric machine 111 according to a comparative example will be described in detail.

Figure 13:
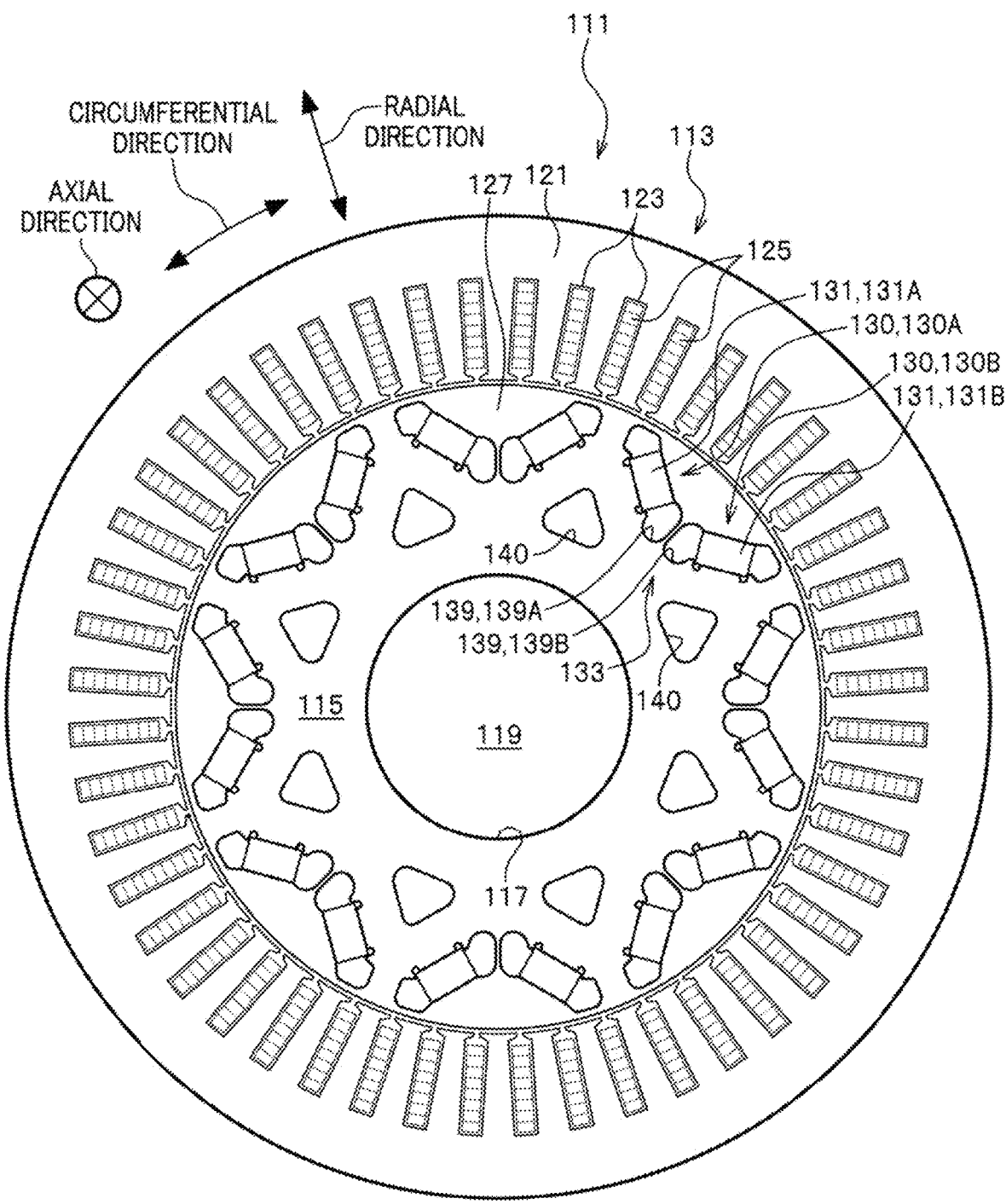
FIG. 13 is a front view of a rotary electric machine according to a comparative example.

FIG. 13 is a front view of the rotary electric machine 111 according to the comparative example. FIG. 14 is an enlarged view illustrating the structure around a magnetic pole portion 133 provided in the rotor 115 of the rotary electric machine 111 according to the comparative example shown in FIG. 13.

As seen in FIG. 13, the rotary electric machine 111 according to the comparative example includes an annular stator 113 and an annular rotor 115.

As with the stator 13 described in the above embodiment, the stator 113 includes a stator core 121, a plurality of slots 123 formed in the stator core 121, and stator coils 125 respectively disposed in the corresponding slots 123.

The stator core 121 is shaped as a circular cylinder as a whole. The stator core 121 may be made, for example, by stacking in the axial direction a plurality of magnetic steel sheets in the form of a disc.

Figure 14:
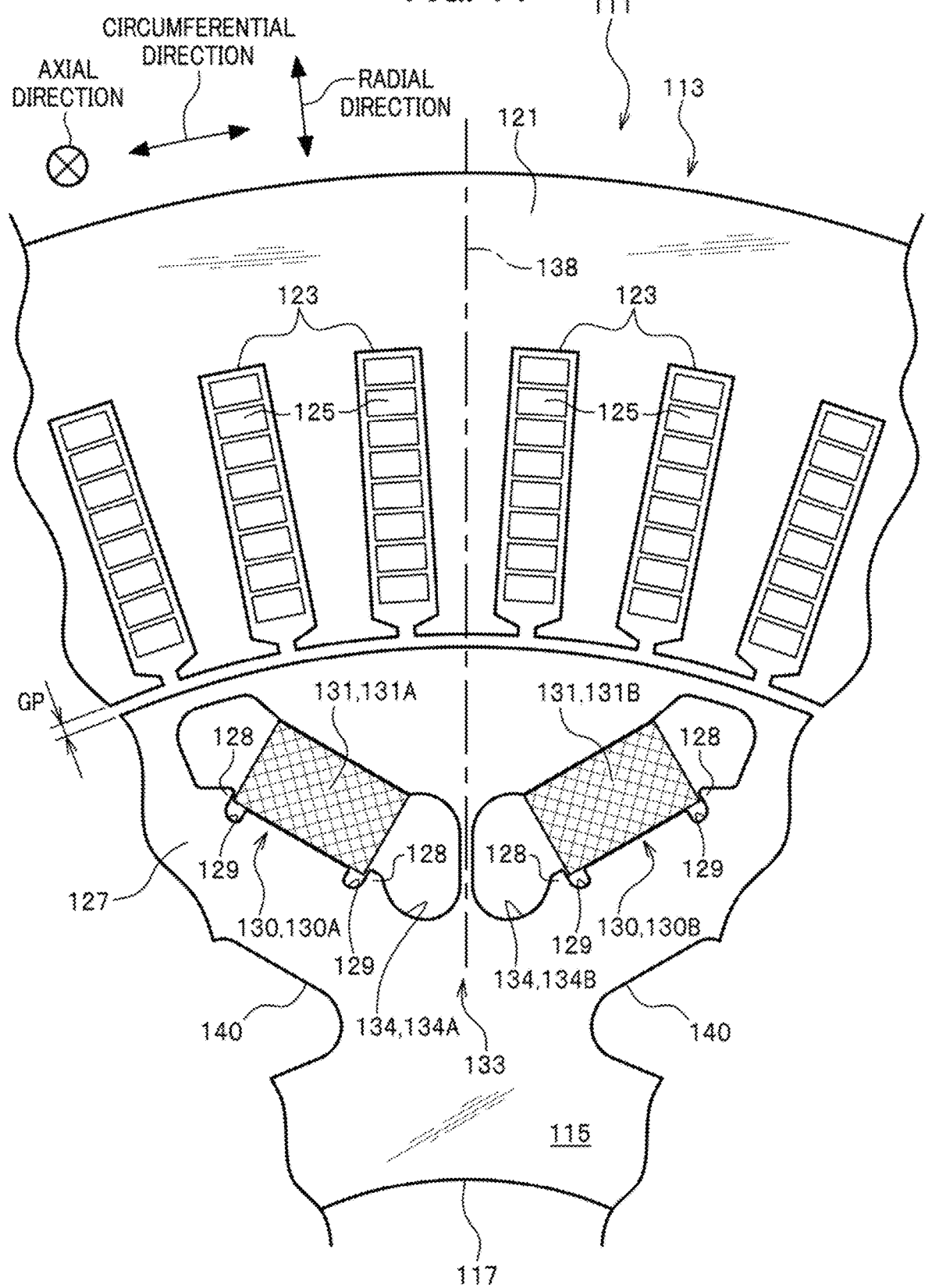
FIG. 14 is an enlarged view illustrating a structure around a magnetic pole portion provided in the rotor of the rotary electric machine according to the comparative example.

As seen in FIG. 14, the rotor 115 is disposed inside the stator 113 and opposite to the inner circumferential wall of the stator 113 with a slight gap GP present therebetween.

As with the rotor 15 described in the above embodiment, as seen in FIGS. 13 and 14, the rotor 115 includes the rotor core 127 and the magnetic pole portions 133. As seen in FIG. 13, a through-hole 117 having a circular cylindrical inner wall is formed in the rotor core 127. A rotary shaft 119 is fitted into the through-hole 117 of the rotor core 127 so that the outer circumferential surface of the rotary shaft 119 is joined to the inner circumferential surface of the through-hole 117. Accordingly, the rotary shaft 119 is fitted into and fixed to the through-hole 117 of the rotor core 127.

As with the stator core 121, the rotor core 127 may be formed, for example, by stacking in the axial direction a plurality of magnetic steel sheets in the form of a disc.

The rotor core 127 includes a plurality of magnetic pole portions 133 disposed at regular intervals along a circumferential direction of the rotor core 127; each magnetic pole portion 133 includes a pair of magnetic material members 130 extending straight in the axial direction. Further, the rotor core 127 has plural pairs of receiving holes 134 for receiving the magnetic material members 130; the receiving holes 134 provided in pair are arranged at predetermined intervals along the circumferential direction. An inner wall of each receiving hole 134 has an inner-side wall surface portion located closer to a radially center of the rotor, and an outer-side wall surface portion located closer to an outer wall of the rotor 115 in the radial direction. The inner-side wall surface portion and the outer-side wall surface portion face each other and are substantially parallel to each other.

The rotor core 127 includes a pair of (i.e., a plurality of) protrusions 128 provided in each of the plurality of receiving holes 134; the protrusions 28 jut out inward from an inner wall (inner-side wall surface portion) of the receiving hole 134 toward the center of the receiving hole 134 to hold a corresponding magnetic material member 130. The protrusions 128 correspond to lugs for holding and positioning the magnetic material member 130.

Further, the rotary electric machine 111 includes a pair of cold thermal stress relieving portions 129 in the inner wall of the receiving hole 134 at positions where the protrusions 128 contact the magnetic material member 130; the cold thermal stress relieving portions 129 are provided for the purpose of dispersing the stress applied to the magnetic material member 130.

Further, generally triangular-shaped hollow portions 140 are formed in the rotor core 127 along the entire length thereof in the axial direction (see FIG. 13).

The magnetic material member 130 is made of a rod-like magnetic member having a substantially rectangular transverse cross section. The length of the magnetic material member 130 is substantially the same as the entire length of the rotor 115 in the axial direction. The magnetic material member 130 is made of a hard magnetic material member 131 only. The size of the magnetic material member 130 in height (i.e., length in the radial direction) and in width (i.e., length in the circumferential direction) are set to the same height (i.e., length in the radial direction) and the same width (i.e., length in the circumferential direction) of the magnetic material member 30 according to the above embodiment.

As seen in FIGS. 13 and 14, each of the magnetic material members 130 according to this comparative example consists of the hard magnetic material member 131 (i.e., permanent magnet). It should be noted that the rotary electric machine 111 according to this comparative example is different from the rotary electric machine 11 according to the above embodiment mainly in that the magnetic material member 130 consists of the hard magnetic material member 131 only.

The hard magnetic material member 131 is made of a hard magnetic substance. As with the rotary electric machine 11 according to the above embodiment, a rare earth magnet, such as a neodymium magnet having high magnetic property and capable of achieving high torque density for instance, may be employed as the hard magnetic substance.

In the rotary electric machine 111 shown in FIGS. 13 and 14, one magnetic pole portion 133 is made by combining a pair of magnetic material members 130A, 130B.

Hereinafter, the pair of magnetic material members 130A, 130B are collectively referred to as a "magnetic material member 130" in a simple manner.

As seen in FIG. 14, a pair of magnetic material members 130A, 130B are disposed symmetrically about a center line 138 extending in the radial direction such that they are inclined outward in the radial direction (see FIG. 14) to form a substantially V-shaped pattern.

To receive pairs of magnetic material members 130A, 130B, as seen in FIGS. 13 and 14, the rotor 115 has plural pairs of receiving holes 134A, 134B. As with the pair of magnetic material members 130A, 130B, a pair of receiving holes 134A, 134B are disposed symmetrically about a center line 138 such that they are inclined outward in the radial direction (see FIG. 14) to form a substantially V-shaped pattern.

Hereinafter, the pair of receiving holes 134A, 134B are collectively referred to as a "receiving hole 134" in a simple manner.

The magnetic material member 130 is received in the receiving hole 134, and is fixed, for example, by adhesive (not shown), to a radially inner wall surface of the receiving hole 134 (i.e., the inner-side wall surface portion of the inner wall of the receiving hole 134 that is located between the pair of protrusions 128) (see FIG. 14).

A pair of magnetic material members 130 constitute one magnetic pole portion 133. The magnetic polarity of the pair of magnetic material members 130 are set such that as with the rotary electric machine 11 according to the above embodiment, radially outer sides of the pair of magnetic material members 130 have the same polarity and that adjacent magnetic pole portions 133 have opposite polarity.

Operational Advantages of Rotary Electric Machine 11 According to this Embodiment Operational advantages of the rotary electric machine 11 according to this embodiment will be described with reference to the drawings, where necessary, while comparing with the rotary electric machine 111 according to the comparative example.

Figure 15:
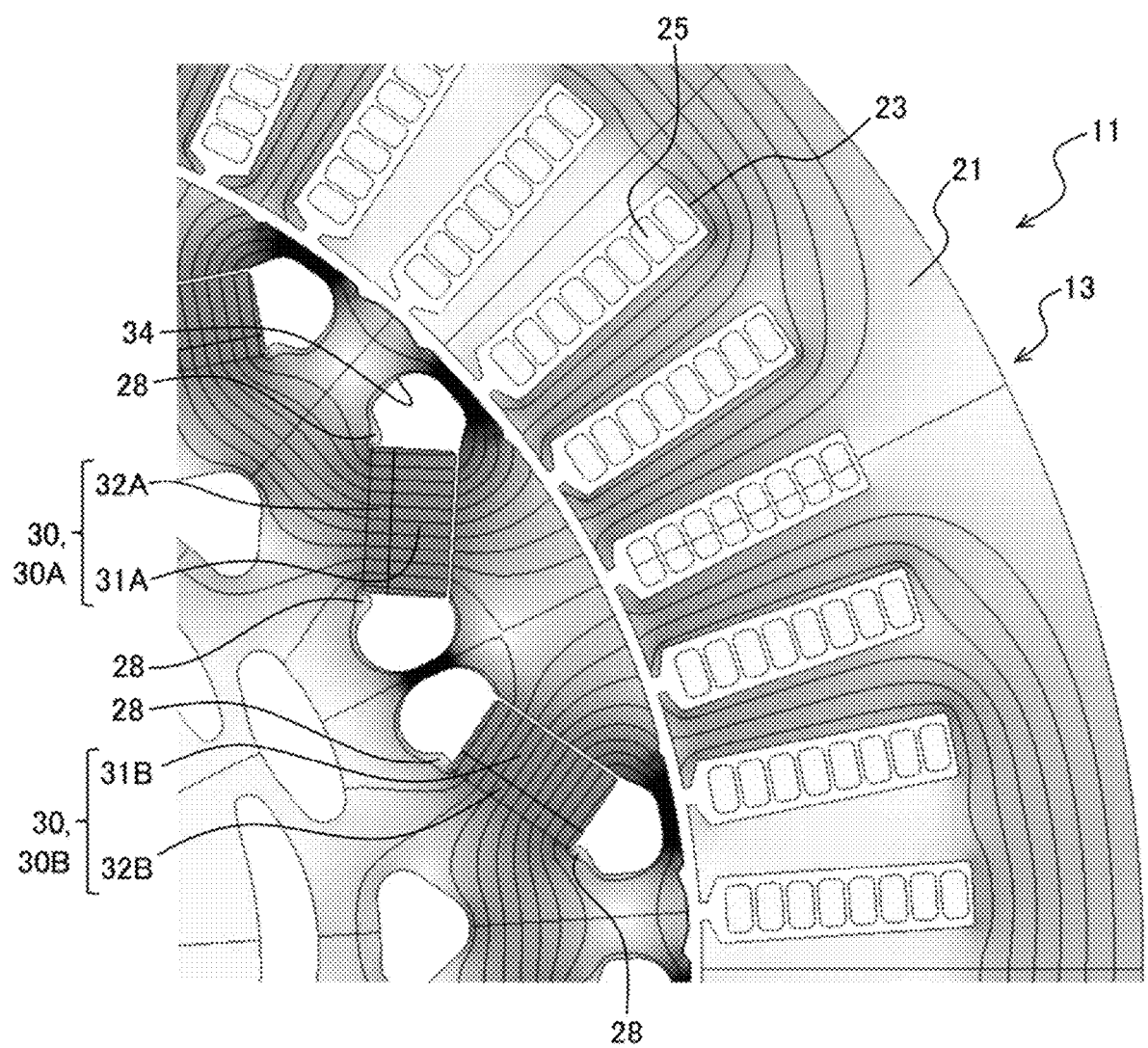
FIG. 15 is a view illustrating magnetic flux density (lines of magnetic flux) around the magnetic pole portion provided in the rotor of the rotary electric machine according to the above embodiment.
Figure 16:
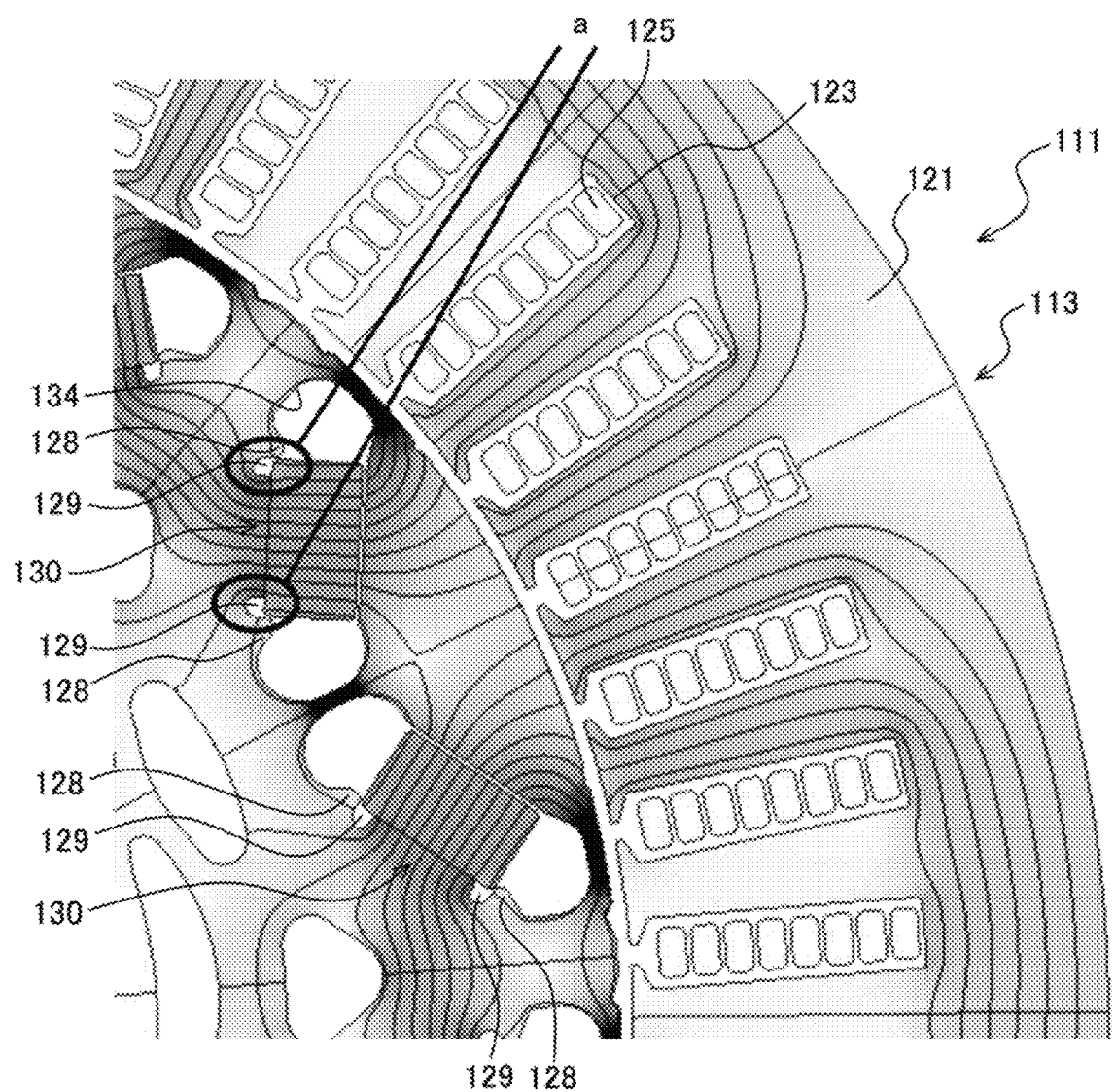
FIG. 16 is a view illustrating magnetic flux density (lines of magnetic flux) around the magnetic pole portion provided in the rotor of the rotary electric machine according to the comparative example.

FIG. 15 is a view illustrating magnetic flux density (lines of magnetic flux) around the magnetic pole portion 33 provided in the rotor 15 of the rotary electric machine 11 according to this embodiment. FIG. 16 is a view illustrating magnetic flux density (lines of magnetic flux) around the magnetic pole portion 133 provided in the rotor 115 of the rotary electric machine 111 according to the comparative example. In FIGS. 15 and 16, the magnetic flux density is shown by light and dark shadings such that the higher the magnetic flux density, the closer the lines of magnetic flux and that the lower the magnetic flux density, the farther the lines of magnetic flux are spaced apart.

As seen in FIG. 16, the rotary electric machine 111 according to the comparative example includes a pair of cold thermal stress relieving portions 129 formed in the inner wall of the receiving hole 134 of the rotor core 127 at positions where the protrusions 128 contact the magnetic material member 130. As illustrated by the reference numeral "a" in FIG. 16, with the provision of the cold thermal stress relieving portions 129 at the surface where the magnetic material member 130 contact the inner wall of the receiving hole 134, the magnetic flux is less likely to pass through the cold thermal stress relieving portions 129. With this configuration of the comparative example, provision of the cold thermal stress relieving portions 129 prevents magnetic flux paths from passing therethrough, and this will disadvantageously cause a decrease in torque density and demagnetization resistance.

In contrast, as seen in FIG. 15, the rotary electric machine 11 according to this embodiment does not include cold thermal stress relieving portions. The configuration without the cold thermal stress relieving portions makes it possible to ensure the magnetic flux paths and to enhance torque density and demagnetization resistance.

As described above, in the rotary electric machine 11 according to this embodiment, the rotor 15 includes a plurality of protrusions 28 provided in each of the plurality of receiving holes 34; the protrusions 28 jut out inward from an inner wall (inner-side wall surface portion) of the receiving hole 34 toward the center of the receiving hole 34 to hold a corresponding magnetic material member 30, each of the magnetic material members 30 includes a hard magnetic material member 31 and a soft magnetic material member 32, which are stacked one on another in a magnetization direction, and the soft magnetic material member 32 is disposed to border the inner wall of the receiving hole 34 at positions where the protrusions 28 are provided.

With this configuration in which the soft magnetic material member 32 made of a low saturation magnetization material is disposed to border the inner wall of the receiving hole 34 at positions where the protrusions 28 are provided, the difference in linear expansion coefficient between the magnetic steel sheet and the low saturation magnetization material becomes extremely lower than the difference in linear expansion coefficient between the magnetic steel sheet and the permanent magnet (hard magnetic material member 31). Accordingly, it is not necessary to provide cold thermal stress relieving portions for dispersing the stress resulting from the difference in linear expansion coefficient between the magnetic steel sheet and the permanent magnet, so that the magnetic flux paths are ensured and the torque density can be improved.

Further, the soft magnetic material member 32 (low saturation magnetization material) is bonded to the permanent magnet (hard magnetic material member 31) and the soft magnetic material member 32 contacts the lugs (protrusions 28), so that unlike the comparative example, the lugs contacting the permanent magnet (hard magnetic material member 131) are not likely to be damaged. Accordingly, it is not necessary to provide gaps each having a rounded corner portion at corners of the permanent magnet. This makes it possible to ensure the magnetic flux paths and to improve the torque density and the demagnetization resistance.

Further, according to this embodiment, the soft magnetic material member 32 has a thickness greater than the thickness of each of the protrusions 28 in the direction of magnetization. Accordingly, even if the temperature of the permanent magnet lowers and the permanent magnet expands in the direction orthogonal to the magnetization direction, the soft magnetic material member 32 can be reliably disposed to border the inner wall (inner-side wall surface portion) of the receiving hole 34 at positions where the protrusions 28 are provided, without the protrusions 28 receiving a stress from the permanent magnet.

Further, according to this embodiment, the soft magnetic material member 32 is made of plural layers of soft magnetic substance members 32a1, 32b1, 32c1, 32d1; 32a2, 32b2, 32c2, ... 32s2, 32t2; 32-3a stacked one on another. This configuration can expect decrease in eddy-current loss that is generated on the soft magnetic material member 32 when fluctuations in magnet-magnetic flux occur in the magnetization direction.

Further, according to this embodiment, surfaces of adjacent soft magnetic substance members 32a2, 32b2, 32c2, ... 32s2, 32t2; 32-3a face in the direction orthogonal to the direction of magnetization (see the soft magnetic material member 32-2 with the second stacked structure as shown in FIGS. 7-11, and the soft magnetic material member 32-3 with the third stacked structure as shown in FIG. 12). This configuration can decrease eddy-current loss that is generated on the soft magnetic material member 32 when fluctuations in magnet-magnetic flux occur in the magnetization direction.

Further, according to this embodiment, surfaces of adjacent soft magnetic substance members 32a1, 32b1, 32c1, 32d1; 32-3a face in the direction of magnetization (see the soft magnetic material member 32-1 with the first stacked structure as shown in FIGS. 3-6, and the soft magnetic material member 32-3 with the third stacked structure as shown in FIG. 12). This configuration can decrease eddy-current loss that is generated on the soft magnetic material member 32 when fluctuations in magnet-magnetic flux occur in the magnetization direction.

Further, according to this embodiment, the saturation flux density of the soft magnetic material member 32 is lower than the residual flux density of the hard magnetic material member 31. Therefore, the soft magnetic material member 32 serves to decrease the magnet-magnetic flux of the hard magnetic material member 31 to further decrease eddy-current loss that is generated on the soft magnetic material member 32 when fluctuations in magnet-magnetic flux occur in the magnetization direction.

If a vehicle is equipped with the above-described rotary electric machine 11 as a prime mover, the rotary electric machine 11 can achieve highly efficient operation without increasing the weight and the body size thereof, so that the vehicle equipped with such rotary electric machine 11 can be obtained.

Modifications

First Modification

Figure 17:
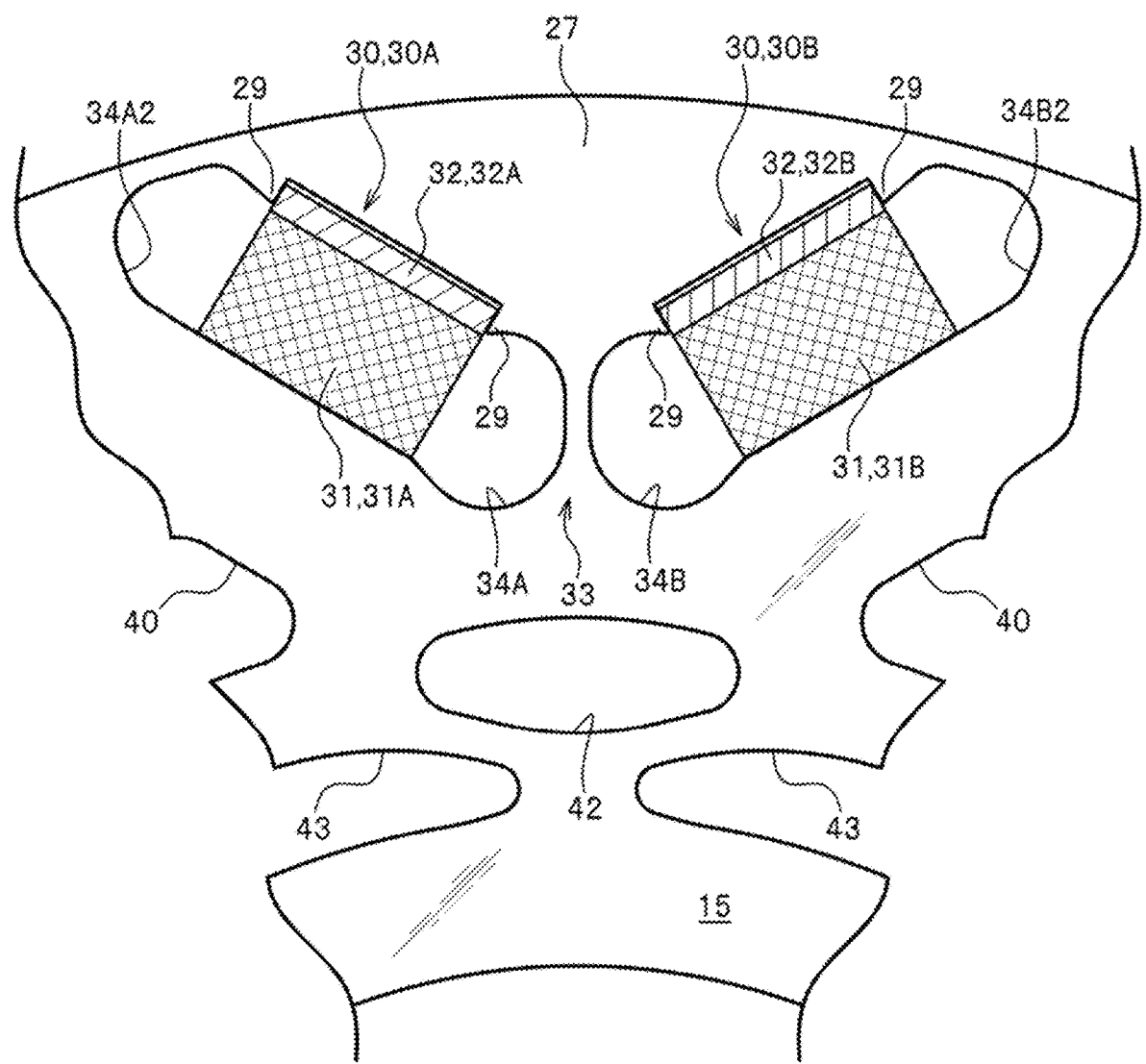
FIG. 17 is an enlarged view illustrating a structure around the magnetic pole portion provided in the rotor of the rotary electric machine according to a first modification of the above embodiment.

FIG. 17 is an enlarged view illustrating a structure around the magnetic pole portion 33 provided in the rotor 15 of the rotary electric machine according to the first modification of the above embodiment. Parts similar to those previously described in the above embodiment with reference to FIG. 2 are denoted by the same reference numerals, and the duplicated explanation will be omitted.

According to the first modification, the lugs (protrusions) are provided on an outer-side wall surface portion of the receiving hole 34 at positions outward of the magnetic material member 30.

As seen in FIG. 17, the rotor core 27 includes a pair of (i.e., a plurality of) protrusions 29 provided in each of the plurality of receiving holes 34; the protrusions 29 jut out inward from the inner wall (outer-side wall surface portion) of the receiving hole 34 toward the center of the receiving hole 34 to hold a corresponding magnetic material member 30. The outer-side wall surface portion is located closer to the peripheral side of the rotor 15 than the inner-side wall surface portion. As with the rotary electric machine 11 shown in FIGS. 1-12, the rotor core 27 according to this modification does not include cold thermal stress relieving portions.

With this configuration of the first modification, as with the above-described embodiment, it is not necessary to provide cold thermal stress relieving portions, so that the magnetic flux paths are ensured and the torque density can be improved (i.e., the same effects as those of the rotary electric machine 11 shown in FIGS. 1-12 can be obtained).

Second Modification

Figure 18:
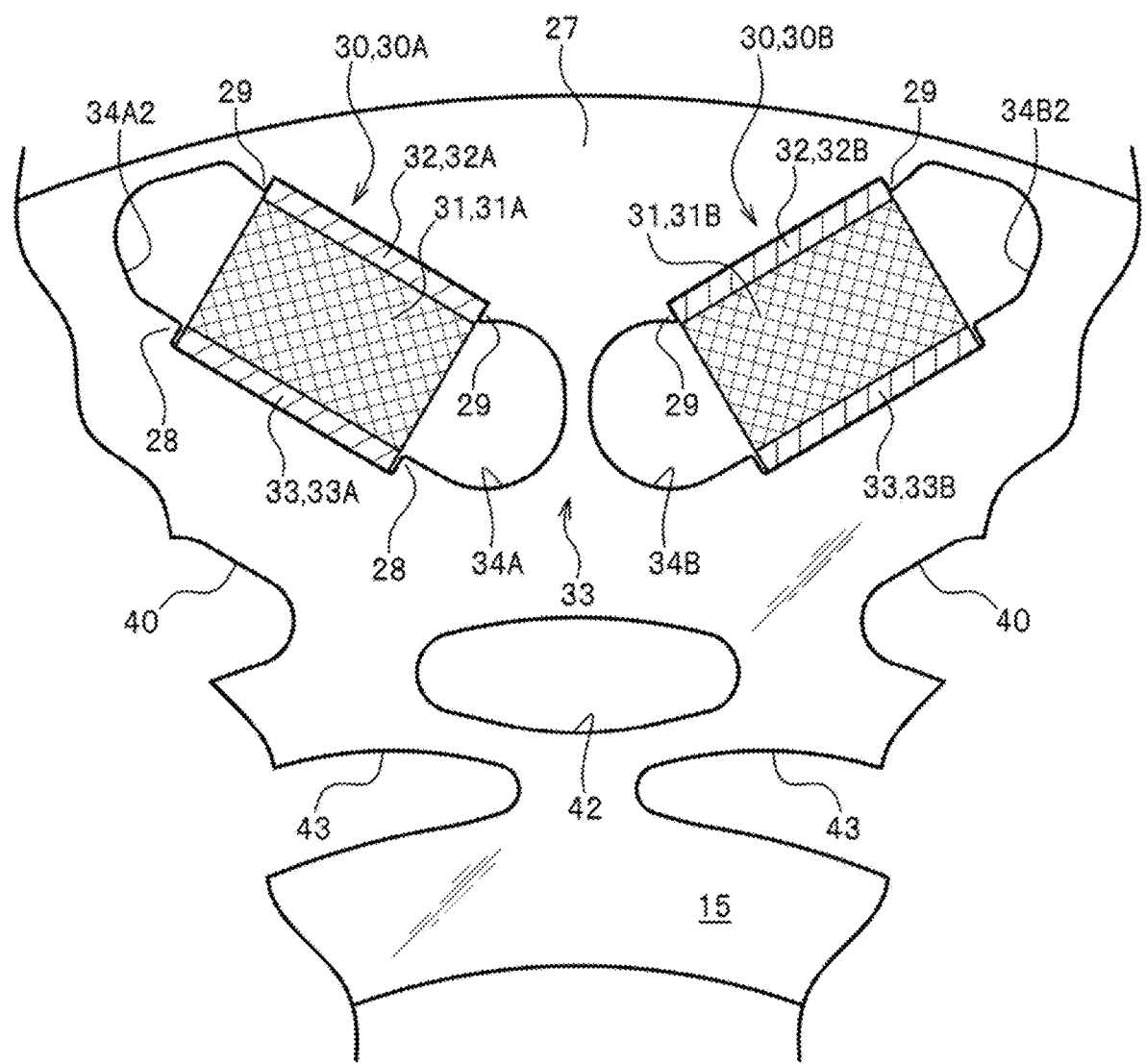
FIG. 18 is an enlarged view illustrating a structure around the magnetic pole portion provided in the rotor of the rotary electric machine according to a second modification of the above embodiment.

FIG. 18 is an enlarged view illustrating a structure around the magnetic pole portion 33 provided in the rotor 15 of the rotary electric machine according to the second modification of the above embodiment. Parts similar to those previously described in the first modification with reference to FIG. 17 are denoted by the same reference numerals, and the duplicated explanation will be omitted.

According to the second modification, the lugs (protrusions) are provided on the inner-side wall surface portion and on the outer-side wall surface portion of the receiving hole 34 at positions inward and outward of the magnetic material member 30.

As seen in FIG. 18, the rotor core 27 includes a pair of (i.e., a plurality of) protrusions 28 and a pair of (i.e., a plurality of) protrusions 29 provided in each of the plurality of receiving holes 34; the protrusions 28 jut out inward from the inner wall (inner-side wall surface portion) of the receiving hole 34 toward the center of the receiving hole 34 to hold a corresponding magnetic material member 30, and the protrusions 29 jut out inward from the inner wall (outer-side wall surface portion) of the receiving hole 34 toward the center of the receiving hole 34 to hold the corresponding magnetic material member 30. As with the rotary electric machine 11 shown in FIGS. 1-12, the rotor core 27 according to this modification does not include cold thermal stress relieving portions.

With this configuration of the second modification, it is not necessary to provide cold thermal stress relieving portions, so that the magnetic flux paths are ensured and the torque density can be improved (i.e., the same effects as those of the rotary electric machine 11 shown in FIGS. 1-12 can be obtained).

Further, with this configuration of the second modification, the magnetic material member 30 can be held in a more reliable manner by the pair of protrusions 28 provided on the inner-side wall surface portion of the receiving hole 34 and by the pair of protrusions 29 provided on the outer-side wall surface portion of the receiving hole 34, that is, at two sides in the radial direction of the rotor 15. According to the second modification, failure of the rotary electric machine 11 due to damage of the protrusions (lugs) can be prevented.

Although the present invention has been described with reference to the above-described embodiment and modifications, the scope of the present invention is not limited to these specific configurations. It is to be understood that various changes and modifications may be made without departing from the gist, spirit or essence of the present invention.

For example, as long as the soft magnetic material member 32 is stacked on the hard magnetic material member 31 in the magnetization direction of the hard magnetic material member 31, the rotary electric machine 11 may be configured such that the soft magnetic material member 32 is disposed on a radially inward side of the hard magnetic material member 31 as shown in FIGS. 1-12, that the soft magnetic material member 32 is disposed on a radially outer side of the hard magnetic material member 31 as shown in FIG. 17, or that the soft magnetic material member 32 is disposed on each the radially inward side and the radially outer side of the hard magnetic material member 31 as shown in FIG. 18.

Further, the rotary electric machine 11 may be configured such that the hard magnetic material member 31 is divided into a plurality of layers disposed in the direction of magnetization and one or more soft magnetic material members 32 are sandwiched between adjacent hard magnetic material members.

Further, in the overall structure of the rotary electric machine 11, the number and the shape of the magnetic material members 30 as constituent elements of the magnetic pole portion 33 and the number and the shape of the receiving holes 34 are not limited to the specific numbers and shapes; as long as the rotating performance of the rotary electric machine 11 is not impaired, the number and the shape of the magnetic material members 30 and the number and the shape of the receiving holes 34 may vary.

Further, in the overall structure of the rotary electric machine 11, the number of the magnetic pole portions 33 and the number of the slots 23 are not limited to the specific numbers; as long as the rotating performance of the rotary electric machine 11 is not impaired, the number of the magnetic pole portions 33 and the number of the slots 23 may vary.

Further, in the overall structure of the rotary electric machine 11, the height (i.e., length in the radial direction) and the width (i.e., length in the circumferential direction) of the magnetic material member 30 having a rectangular transvers cross section can be set to appropriate values based on the results obtained through experiments and simulations of effects on the output characteristics of the rotary electric machine 11 and the target output characteristics that are to be compared and balanced.

The rotary electric machine 11 according to the present invention may be a low-profile motor or generator to be mounted, for example, on a hybrid automobile (hybrid vehicle). However, as long as a vehicle is equipped with a rotary electric machine, the rotary electric machine 11 may be applied to a vehicle other than the hybrid vehicle (e.g., an electric vehicle or a fuel cell vehicle, in which an engine is not provided and only a motor is provided as a prime mover).

The invention claimed is:

1. A rotary electric machine comprising:
an annular stator including a stator core and coils disposed in the stator core; and
an annular rotor disposed inside the stator and opposite to an inner circumferential wall of the stator with a gap present therebetween, the rotor including a rotor core having a plurality of receiving holes for magnetic material members, which receiving holes extend in an axial direction of a drive shaft and are arranged in a circumferential direction of the rotor core,
wherein the rotor includes a plurality of protrusions provided in each of the plurality of receiving holes, the protrusions jutting out from an inner wall of the receiving hole to hold a corresponding magnetic material member,
wherein each of the magnetic material members comprises a hard magnetic material member and a soft magnetic material member, which are stacked one on another in a magnetization direction,
wherein the soft magnetic material member is disposed to border the inner wall of the receiving hole at positions where the protrusions are provided, and
wherein the soft magnetic material member has a thickness greater than a thickness of each of the protrusions in the direction of magnetization.

2. The rotary electric machine according to claim 1, wherein the soft magnetic material member is made of plural layers of soft magnetic substance members stacked one on another.

3. The rotary electric machine according to claim 2, wherein surfaces of adjacent soft magnetic substance members extend in a direction orthogonal to the direction of magnetization.

4. The rotary electric machine according to claim 3, wherein a saturation flux density of the soft magnetic material member is lower than a residual flux density of the hard magnetic material member.

5. The rotary electric machine according to claim 2, wherein surfaces of adjacent soft magnetic substance members extend in the direction of magnetization.

6. The rotary electric machine according to claim 5, wherein a saturation flux density of the soft magnetic material member is lower than a residual flux density of the hard magnetic material member.

7. The rotary electric machine according to claim 2, wherein a saturation flux density of the soft magnetic material member is lower than a residual flux density of the hard magnetic material member.

8. The rotary electric machine according to claim 1, wherein the inner wall of the receiving hole has an inner-side wall surface portion located closer to a radially center of the rotor and an outer-side wall surface portion located closer to an outer wall of the rotor, the inner-side wall surface portion and the outer-side wall surface portion facing each other,
wherein the plurality of protrusions comprises a pair of protrusions jutting out from the inner wall, and
wherein the soft magnetic material member is disposed to border the inner wall between the pair of protrusions.

9. The rotary electric machine according to claim 8, wherein the plurality of receiving holes are disposed symmetrically about a center of the rotor core, and
wherein each of the receiving holes is inclined with respect to a radial direction of the rotor core.

10. The rotary electric machine according to claim 9, wherein the pair of protrusions are jut out from the inner-side wall surface portion.

11. The rotary electric machine according to claim 9, wherein the pair of protrusions are jut out from the outer-side wall surface portion.

12. A vehicle equipped with a prime mover, wherein the rotary electric machine according to claim 1 is mounted on the vehicle as the prime mover.

13. The rotary electric machine according to claim 1, wherein the rotor core is formed by stacking in the axial direction a plurality of magnetic steel sheets in the form of a disc, and
   wherein a difference in linear expansion coefficient between the soft magnetic material member and the magnetic steel sheets is lower than a difference in linear expansion coefficient between the hard magnetic material member and the magnetic steel sheets.

14. The rotary electric machine according to claim 1, wherein the hard magnetic material member and the soft magnetic material member have a same width in a direction orthogonal to the direction of magnetization.

\* \* \* \* \*